United States Patent
Konishi et al.

(10) Patent No.: US 8,724,954 B2
(45) Date of Patent: May 13, 2014

(54) OPTICAL FIBER, OPTICAL FIBER CORD, AND OPTICAL FIBER CABLE

(75) Inventors: Tatsuya Konishi, Yokohama (JP); Tetsuya Nakanishi, Yokohama (JP); Tetsuya Hayashi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/805,465

(22) PCT Filed: Mar. 19, 2012

(86) PCT No.: PCT/JP2012/057014
§ 371 (c)(1),
(2), (4) Date: Dec. 19, 2012

(87) PCT Pub. No.: WO2012/128250
PCT Pub. Date: Sep. 27, 2012

(65) Prior Publication Data
US 2013/0094825 A1    Apr. 18, 2013

(30) Foreign Application Priority Data

Mar. 23, 2011  (JP) .................. 2011-064150

(51) Int. Cl.
*G02B 6/02*     (2006.01)
(52) U.S. Cl.
USPC .......................................... 385/128
(58) Field of Classification Search
USPC .......................................... 385/123, 126, 128
See application file for complete search history.

(56) References Cited

U.S. PATENT DOCUMENTS

2006/0039665 A1    2/2006 Matsuo et al.

FOREIGN PATENT DOCUMENTS

| JP | 8-5877 | 1/1996 |
|---|---|---|
| JP | 9-127354 | 5/1997 |
| JP | 10-206669 | 8/1998 |
| JP | 2001-108874 | 4/2001 |
| JP | 2003-300744 | 10/2003 |
| JP | 2004-107184 | 4/2004 |
| JP | 2005-8448 | 1/2005 |
| JP | 2005-202440 | 7/2005 |
| JP | 2010-181641 | 8/2010 |
| WO | 2004/092794 | 10/2004 |

*Primary Examiner* — Ryan Lepisto
*Assistant Examiner* — Erin Chiem
(74) *Attorney, Agent, or Firm* — Drinker Biddle & Reath LLP

(57) ABSTRACT

A trench optical fiber that stably realizes a small transmission loss includes (1) a core extending in an axial direction while containing an axial center of the fiber, the core having a diameter d1 of 7.0 μm to 7.4 μm; (2) a first optical cladding layer surrounding the core and having an outside diameter d2 of 1.67d1 to 2.5d1; (3) a second optical cladding layer surrounding the first optical cladding layer; and (4) a jacket layer surrounding the second optical cladding layer and containing fluorine having a concentration of 0.06 wt % or higher. A relative refractive index difference Δ1 of the core with respect to the jacket layer is 0.31% to 0.37%. A relative refractive index difference Δ2 of the first optical cladding layer with respect to the jacket layer is +0.02% or larger and smaller than Δ1. A relative refractive index difference Δ3 of the second optical cladding layer with respect to the jacket layer is −0.2% or smaller.

13 Claims, 4 Drawing Sheets

OPTICAL FIBER, OPTICAL FIBER CORD, AND OPTICAL FIBER CABLE

TECHNICAL FIELD

The present invention relates to an optical fiber, an optical fiber cord, and an optical fiber cable.

BACKGROUND ART

International Publication No. 2004/092794 (Patent Literature 1) discloses an optical fiber including a core (with a radius r1 and a relative refractive index difference Δ1) extending in the axial direction while containing the axial center of the fiber, a first optical cladding layer (with a radius r2 and a relative refractive index difference Δ2) surrounding the core, a second optical cladding layer (with a radius r3 and a relative refractive index difference Δ3) surrounding the first optical cladding layer, and a jacket layer surrounding the second optical cladding layer. The relative refractive index differences Δ1 to Δ3 satisfy a relationship of Δ1>Δ2>Δ3. Such a refractive index structure is called trench structure. A trench optical fiber has a small bending loss and has been suitably used as an optical transmission line for fiber to the x (FTTx) in recent years, mainly for intra-office wiring and the like in which optical fibers tend to be bent.

Patent Literature 1 discloses as follows. In the trench optical fiber, setting the ratio (r1/r2) of the radius r1 of the core to the radius r2 of the first optical cladding layer to 0.22 to 0.4 realizes a mode field diameter whose ratio to the mode field diameter of a general-purpose single-mode optical fiber having the same cutoff wavelength is 0.98 or larger. This reduces the splicing loss occurring in the fusion-splicing of the trench optical fiber to the general-purpose single-mode optical fiber. The general-purpose single-mode optical fiber referred to herein is an optical fiber not including the second optical cladding layer and having a simple, substantially stepped refractive index profile.

In recent years, the field of use of trench optical fibers, such as the one disclosed by Patent Literature 1, has expanded. In some cases, trench optical fibers are used as optical transmission lines for relatively long-distance optical transmission. Optical transmission lines must have a sufficient level of an optical signal-to-noise ratio (OSNR) so that transmission errors do not occur. The trench optical fiber disclosed by Patent Literature 1, however, has a relatively large transmission loss, making it difficult to provide a sufficient level of OSNR.

SUMMARY OF INVENTION

Technical Problem

An object of the present invention is to provide a trench optical fiber that stably realizes a small transmission loss. Another object of the present invention is to provide an optical fiber cord and an optical fiber cable each including such an optical fiber.

Solution to Problem

To achieve the above objects, the present invention provides an optical fiber including (1) a core extending in an axial direction while containing an axial center of the fiber, the core having a diameter d1 of 7.0 μm to 7.4 μm; (2) a first optical cladding layer surrounding the core and having an outside diameter d2 of 1.67 d1 to 2.5 d1 (d1/d2=0.4 to 0.6); (3) a second optical cladding layer surrounding the first optical cladding layer; and (4) a jacket layer surrounding the second optical cladding layer and containing fluorine (F) having a concentration of 0.06 wt % or higher. A relative refractive index difference Δ1 of the core with respect to the jacket layer is 0.31% to 0.37%. A relative refractive index difference Δ2 of the first optical cladding layer with respect to the jacket layer is +0.02% or larger and smaller than Δ1. A relative refractive index difference Δ3 of the second optical cladding layer with respect to the jacket layer is −0.2% or smaller.

In the optical fiber according to the present invention, it is preferable that d2 be 2.0 d1 to 2.5 d1 (d1/d2=0.4 to 0.5), a mode field diameter MFD defined on the basis of a moment of a far-field pattern be 8.4 μm to 9.2 μm at a wavelength of 1.31 μm, and a ratio (MFD1/MFD) of a mode field diameter MFD1 defined on the basis of a moment of an electric-field distribution to the MFD be 1.015 or smaller while a cable cutoff wavelength is 1260 nm or shorter.

In the optical fiber according to the present invention, the relative refractive index difference Δ3 of the second optical cladding layer may be −0.6% or larger. In that case, it is preferable that a zero-dispersion slope at a zero-dispersion wavelength be 0.092 ps/nm$^2$/km or smaller. Furthermore, in the optical fiber according to the present invention, the relative refractive index difference Δ3 of the second optical cladding layer may be −0.6% or smaller. In that case, it is preferable that the zero-dispersion slope at the zero-dispersion wavelength be larger than 0.092 ps/nm$^2$/km.

It is preferable that the optical fiber according to the present invention further include a primary coating layer surrounding the jacket layer and having a Young's modulus of 0.6 MPa or smaller, and a secondary coating layer surrounding the primary coating layer and having a Young's modulus of 1000 MPa or larger. In that case, it is preferable that a ratio (P/S) of an outside diameter of the primary coating layer to an outside diameter of the secondary coating layer be 75 to 95%.

In the optical fiber according to the present invention, it is preferable that a difference in transmission loss at 1550 nm between that before the optical fiber is formed into a cable and that after the optical fiber is formed into a cable be 0.05 dB/km or smaller, or more preferably 0.02 dB/km or smaller. Furthermore, it is preferable that a fusion-splicing loss with respect to a general-purpose single-mode optical fiber having a substantially stepped refractive index structure be 0.05 dB or smaller.

An optical fiber cord according to the present invention includes the optical fiber according to the present invention. Furthermore, an optical fiber cable according to the present invention includes the optical fiber according to the present invention.

Advantageous Effects of Invention

The trench optical fiber according to the present invention stably realizes a small transmission loss.

DESCRIPTION OF EMBODIMENTS

Figure 1:
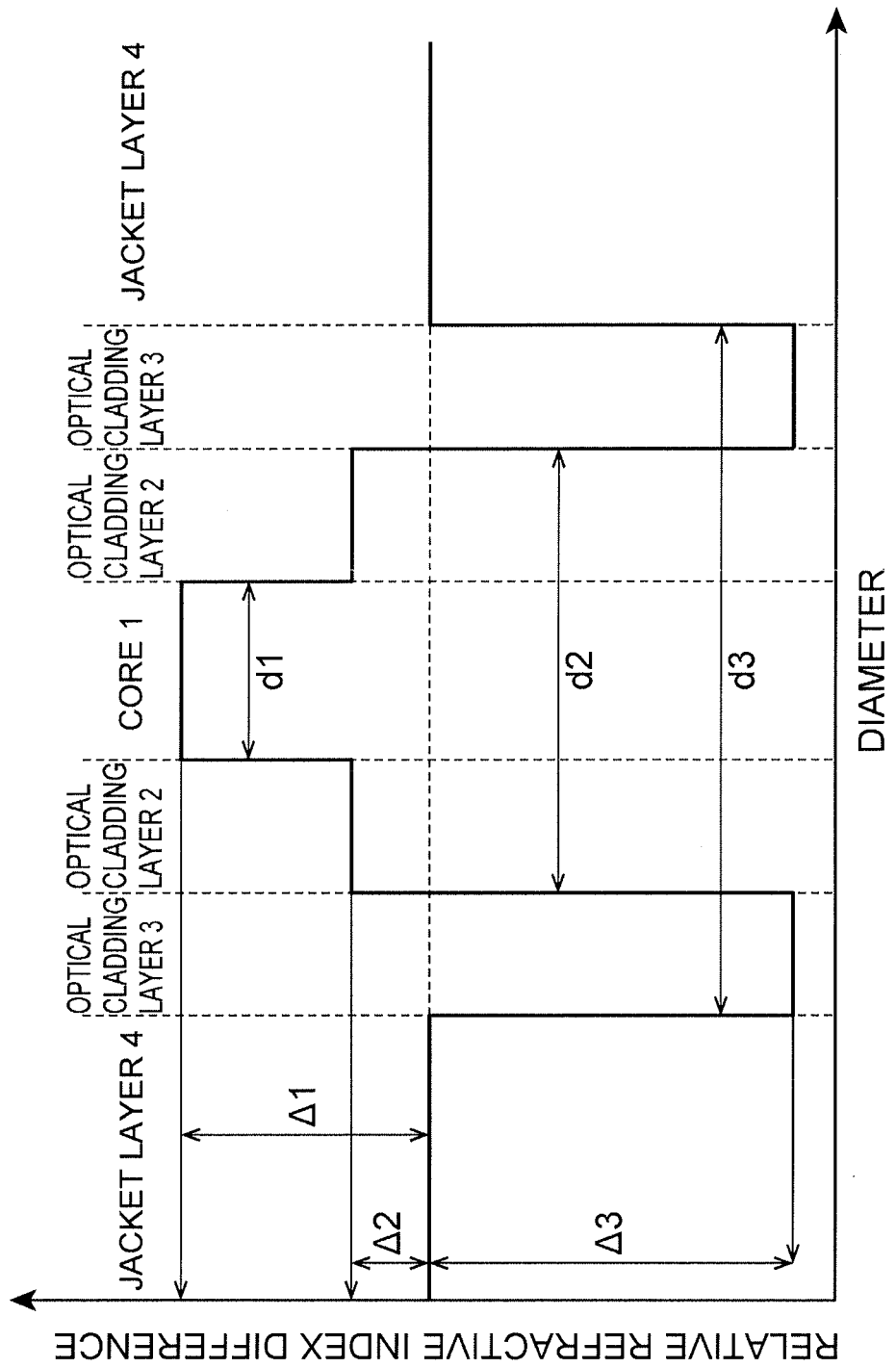
FIG. 1 is a conceptual diagram illustrating a refractive index profile of an optical fiber according to the present invention.

Embodiments of the present invention will now be described in detail with reference to the accompanying drawings. In the description of the drawings, the identical reference numerals denote same elements, and redundant description is omitted.

FIG. 1 is a conceptual diagram illustrating a refractive index profile of an optical fiber according to the present invention. The optical fiber according to the present invention includes a core 1 extending in the axial direction while containing the axial center of the fiber, a first optical cladding layer 2 surrounding the core 1, a second optical cladding layer 3 surrounding the first optical cladding layer 2, and a jacket layer 4 surrounding the second optical cladding layer 3.

Taking the refractive index of the jacket layer 4 as a reference, the relative refractive index difference of the core 1 is denoted by Δ1, the relative refractive index difference of the first optical cladding layer 2 is denoted by Δ2, and the relative refractive index difference of the second optical cladding layer 3 is denoted by Δ3. In this case, the relative refractive index difference Δ1 of the core 1 is 0.31% to 0.37%. The relative refractive index difference Δ2 of the first optical cladding layer 2 is +0.02% or larger. The relative refractive index difference Δ3 of the second optical cladding layer 3 is −0.2% or smaller. The optical fiber according to the present invention has a trench structure and satisfies a relationship of Δ1>Δ2>Δ3<Δ4.

The core 1, the first optical cladding layer 2, the second optical cladding layer 3, and the jacket layer 4 are each chiefly composed of silica glass and are, according to need, each doped with impurities for adjustment of the refractive index. The jacket layer 4 is doped with the element F for reduction of the refractive index at a F concentration of 0.06 wt % or higher. The second optical cladding layer 3 is doped with the element F at a F concentration higher than that of the jacket layer 4. The core 1 is doped with $GeO_2$ for increase of the refractive index.

The diameter of the core 1 is denoted by d1. The outside diameter of the first optical cladding layer 2 is denoted by d2. The outside diameter of the second optical cladding layer 3 is denoted by d3. Here, the core diameter d1 is 7.0 μM to 7.4 μm, and a ratio (d1/d2) is 0.4 to 0.6.

The range in which the advantageous effects of the present invention can be produced (the range defined by claim 1), a preferable range, and the best value for each of Δ1, Δ2, Δ3, d1, d1/d2, the F concentration in the jacket layer 4, MFD (at a wavelength of 1310 nm), and MFD1/MFD that are defined for the optical fiber according to the present invention are summarized in a table.

TABLE

| | | Range defined by claim 1 | Preferable range | best |
|---|---|---|---|---|
| Δ1 | % | 0.31 to 0.37 | 0.34 to 0.36 | 0.35 |
| Δ2 | % | >=0.02 | >=0.02 | 0.02 |
| Δ3 | % | <=−0.2 | −0.7 to −0.5 | −0.6 |
| d1 | μm | 7.0 to 7.4 | 7.2 to 7.4 | 7.3 |
| d1/d2 | | 0.4 to 0.6 | 0.41 to 0.5 | 0.48 |
| F concentration | wt % | >=0.06 | >=0.06 | 0.08 |
| MFD @ 1310 nm | μm | 8.4 to 9.2 | 8.4 to 9.2 | 8.6 |
| MFD1/MFD | | <=1.015 | <=1.015 | 1.008 |

Here, MFD1 and MFD each refer to a mode field diameter representing the spreading of a field distribution observed in the optical fiber but are defined by different equations. The mode field diameter MFD1 is defined on the basis of the moment of an electric-field distribution and is double a value Wm calculated by Eq. (1):

$$W_m^2 = 2 \frac{\int_0^\infty \phi^2(r) r^3 \, dr}{\int_0^\infty \phi^2(r) r \, dr} \quad (1)$$

and the mode field diameter MFD is defined on the basis of the moment of a far-field pattern and is double a value Wp calculated by Eq. (2):

$$W_p^2 = 2 \frac{\int_0^\infty \phi^2(r) r \, dr}{\int_0^\infty \left(\frac{d\phi(r)}{dr}\right)^2 r \, dr} \quad (2)$$

where r denotes a variable representing the position in the radial direction, and φ(r) denotes an electric-field distribution along the radial direction.

In a general trench optical fiber, the second optical cladding layer provided near the core is doped with the element F at a high concentration. This tends to lead to an increase in the transmission loss due to Rayleigh scattering. Such a transmission loss tends to be larger than that of a general-purpose single-mode optical fiber. In contrast, in the optical fiber according to the present invention, since the jacket layer 4 is doped with the element F at 0.06 wt % or higher, the jacket layer 4 has a reduced viscosity. This lowers the fictive temperature, which is determined by the viscosity, and therefore reduces the Rayleigh scattering due to any structural defects of the glass forming optical fibers which are drawn under the same drawing tension. Consequently, the transmission loss is reduced. Some optical fibers according to the present invention realize a transmission loss of 0.195 dB/km or smaller at a wavelength of 1550 nm.

Figure 2:
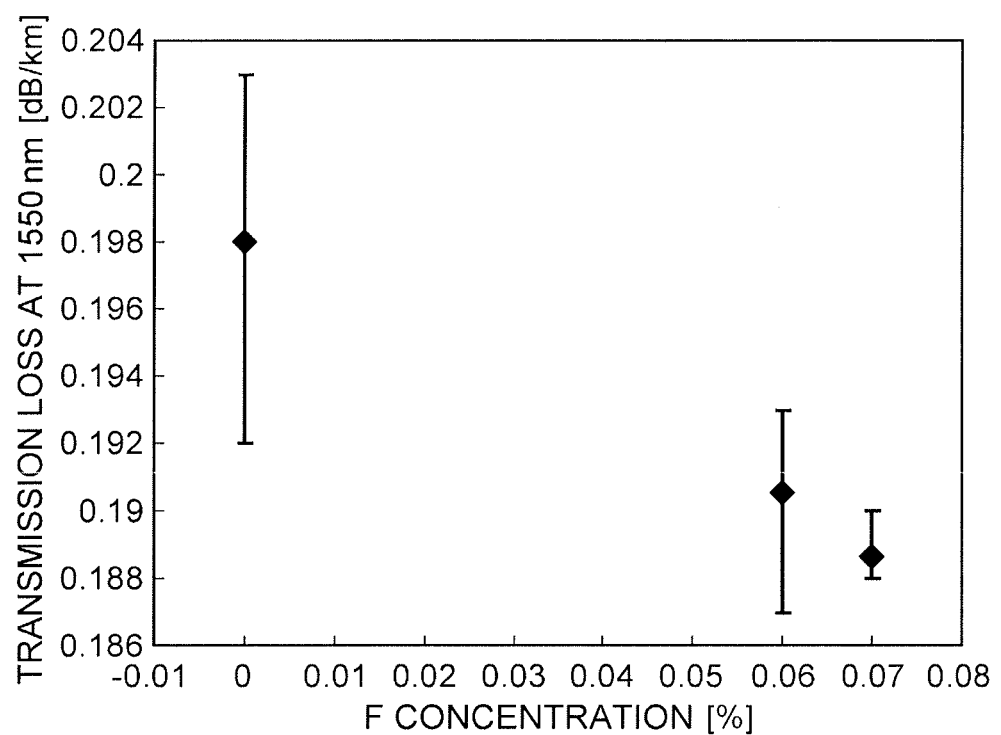
FIG. 2 is a graph illustrating the transmission loss at a wavelength of 1550 nm versus the F concentration.

FIG. 2 is a graph illustrating the transmission loss at a wavelength of 1550 nm versus the F concentration in the jacket layer. FIG. 2 shows that the median of the transmission loss at a F concentration of 0.07 wt % is 0.189 dB/km, the median of the transmission loss at a F concentration of 0.06 wt % is 0.190 dB/km, and the median of the transmission loss at a F concentration of 0.00 wt % is 0.198 dB/km. As can be seen, the higher the F concentration, the smaller the transmission loss.

Refractive index of the jacket layer 4 becomes smaller, when the jacket layer 4 is doped with the element F for reduction of the viscosity. However, if d1/d2 is set appropriately, a cable cutoff wavelength λcc can be shortened while a bending loss is maintained, and a fiber conforming to an international standard defined as ITU-T.G.657.A2 or G.657.B3 can be obtained. In the optical fiber according to the present invention, if the F concentration in the jacket layer 4 is set to 0.06 wt % or higher and d1/d2 is set within a range from 0.33 to 0.6, the cable cutoff wavelength λcc becomes shortest. More preferably, d1/d2=0.4 to 0.5.

In general, there is a trade-off relationship between the reduction of the bending loss of an optical fiber and the shortening of the cable cutoff wavelength λcc. Furthermore, the cable cutoff wavelength λcc is proportional to the core diameter. Therefore, if the cable cutoff wavelength λcc can be shortened while the bending loss is maintained, the manufacturing tolerance of the core diameter can be increased. In the optical fiber according to the present invention, d1/d2 is set appropriately, whereby a short cable cutoff wavelength λcc is realized while the bending loss is maintained.

Figure 3:
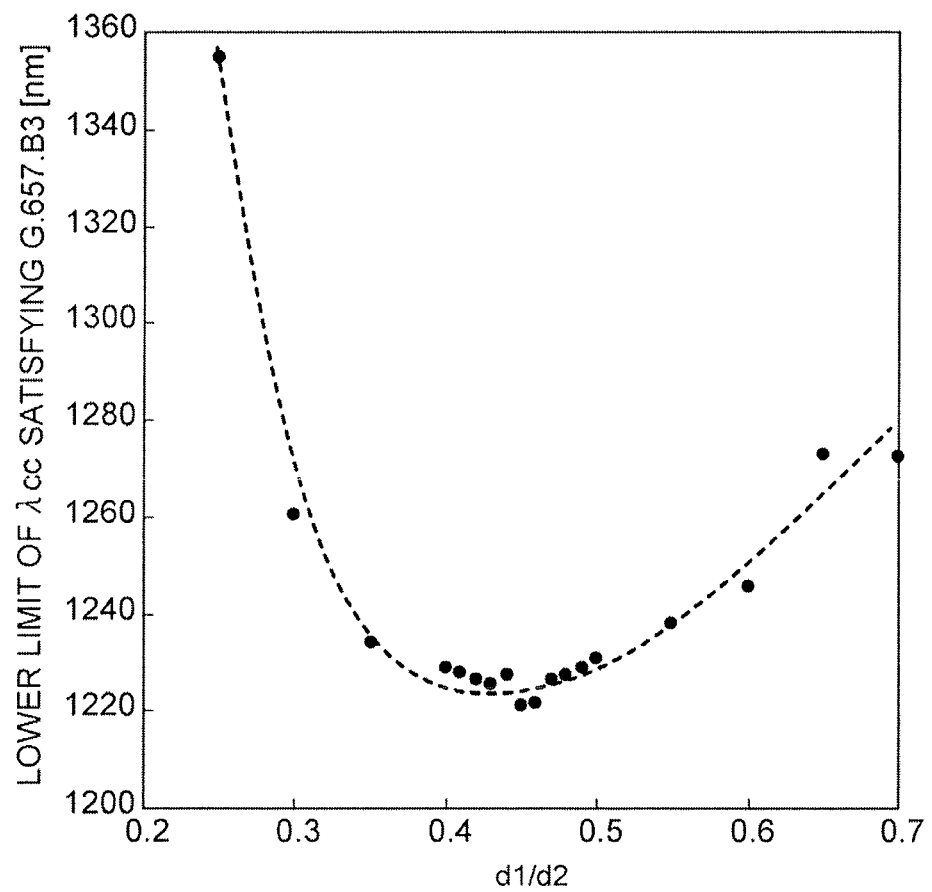
FIG. 3 is a graph illustrating the lower limit of a cable cutoff wavelength λcc that realizes the bending loss at an R of 5 mm specified by the G.657.B3 standard versus d1/d2.

FIG. 3 is a graph illustrating the lower limit of the cable cutoff wavelength λcc that realizes the bending loss at an R of 5 mm specified by the ITU-T.G.657.B3 (0.15 dB/turn @ 1550 nm) versus d1/d2. Herein, Δ1=0.34%, Δ2=0.02%, and Δ3=−0.7%. As can be seen from FIG. 3, the lower limit of the cable cutoff wavelength λcc that satisfies the bending-loss standard depends on d1/d2 and becomes shortest within the range from 0.4 to 0.5. That is, an optical fiber according to an embodiment of the present invention in which d1/d2 falls within the range from 0.4 to 0.5 has a reduced lower limit of the range of single-mode operating wavelength.

Figure 4:
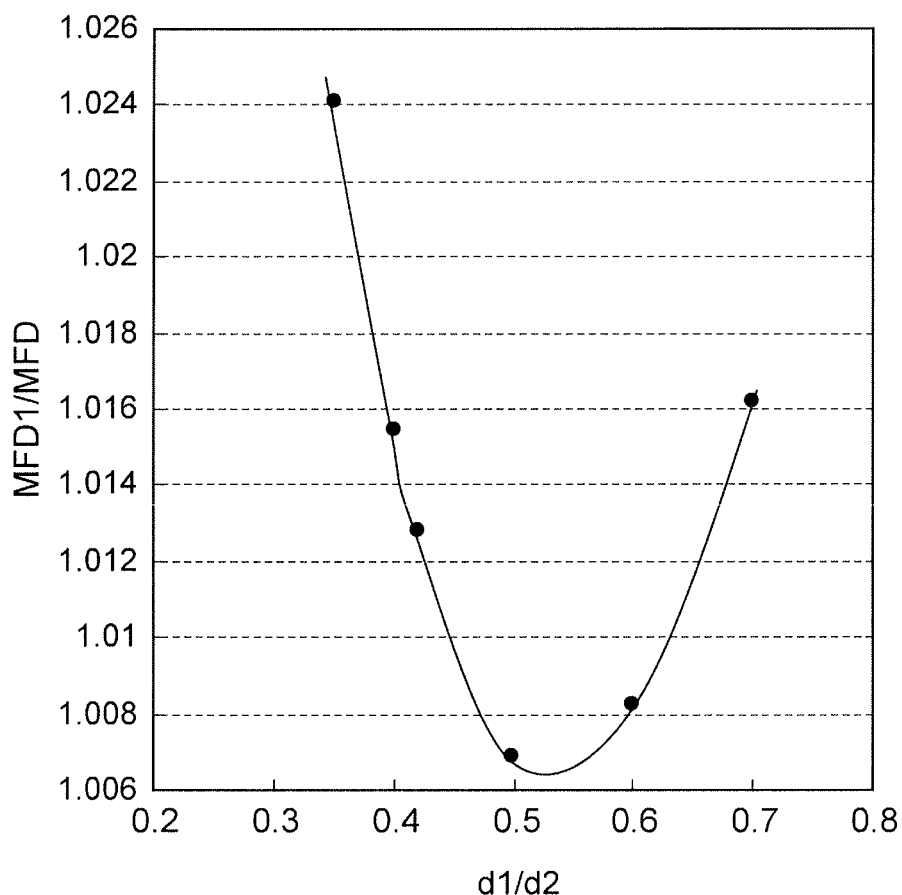
FIG. 4 is a graph illustrating MFD1/MFD versus d1/d2.

In the optical fiber according to the present invention, d1/d2 is set appropriately, whereby MFD1 can be made significantly smaller than MFD. As MFD1 becomes smaller, the increase in the microbending loss becomes smaller. Therefore, by adjusting d1/d2, MFD1 can be made smaller while MFD associated with the splicing loss is maintained to be constant. FIG. 4 is a graph illustrating MFD1/MFD versus d1/d2.

In the optical fiber according to the present invention, if d1/d2 is set to 0.4 to 0.7, MFD1/MFD can be significantly reduced to 1.015 or smaller. Furthermore, if d1/d2 is set to 0.41 to 0.63, MFD1/MFD can be preferably reduced to 1.013 or smaller. Thus, the microbending loss due to lateral pressure occurring in the cable can be prevented from increasing. Furthermore, as Δ3 is made smaller, the cable cutoff wavelength λcc can be made shorter while the bending loss is maintained. If Δ3 is set to −0.2% or smaller, an optical fiber satisfying ITU-T.G.657.A2 or B3 is obtained.

As described above, the optical fiber according to the present invention has a reduced transmission loss, a reduced macrobending loss (bending loss), a reduced microbending loss, and a reduced splicing loss. An optical fiber cord or an optical fiber cable including such an optical fiber also has a reduced transmission loss.

Other preferred embodiments of the optical fiber according to the present invention are as follows. In an optical fiber according to a preferred embodiment, the ratio (d1/d2) is 0.4 to 0.5, MFD at a wavelength of 1.31 μm is 8.4 μm to 9.2 μm, and the ratio (MFD1/MFD) is 1.015 or smaller. Thus, the cable cutoff wavelength λcc can be shortened, and MFD1 can be reduced.

In an optical fiber according to another preferred embodiment, the relative refractive index difference Δ3 of the second optical cladding layer is −0.6% or larger, and the zero-dispersion slope at the zero-dispersion wavelength is 0.092 ps/nm$^2$/km or smaller. As Δ3 becomes smaller, the cable cutoff wavelength λcc can be made shorter while the bending loss is maintained, whereas the zero-dispersion slope at the zero-dispersion wavelength becomes larger, deviating from the range defined by ITU-T.G.652. In contrast, by setting Δ3 to −0.6% or larger, the zero-dispersion slope at the zero-dispersion wavelength can be made to fall within the range defined by ITU-T.G.652 and the cable cutoff wavelength λcc for the uniform bending loss can be shortened.

In an optical fiber according to yet another preferred embodiment, the relative refractive index difference Δ3 of the second optical cladding layer is −0.6% or smaller, and the zero-dispersion slope at the zero-dispersion wavelength is larger than 0.092 ps/nm$^2$/km. As Δ3 becomes smaller, the cable cutoff wavelength λ cc can be made shorter while the bending loss is maintained. By setting Δ3 to −0.6% or smaller, the cable cutoff wavelength λcc can be significantly shortened. This embodiment is suitably applicable to an optical fiber that is not required to conform to ITU-T.G.652, such as an optical fiber for appliance wiring.

In an optical fiber according to yet another preferred embodiment, the difference in transmission loss at a wavelength of 1550 nm between that before the optical fiber is formed into a cable and that after the optical fiber is formed into a cable is 0.05 dB/km or smaller, or more preferably 0.02 dB/km or smaller. In this embodiment, by reducing MFD1/MFD, the microbending loss can be reduced while the MFD is maintained.

An optical fiber according to yet another preferred embodiment further includes a primary coating layer made of resin, surrounding the jacket layer 4, and having a Young's modulus of 0.6 MPa or smaller, and a secondary coating layer made of resin, surrounding the primary coating layer, and having a Young's modulus of 1000 MPa or larger. With the primary coating layer and the secondary coating layer having such physical properties, the increase in the transmission loss due to microbending can be more preferably suppressed. Moreover, if the ratio (P/S) of the outside diameter of the primary coating layer to the outside diameter of the secondary coating layer is set to 75 to 95% while the above Young's moduli of the resins are maintained, an optical fiber having a diameter of the coating layer as small as 220 μm or smaller and a reduced microbending loss is realized.

In an optical fiber according to yet another preferred embodiment, the fusion-splicing loss with respect to a general-purpose single-mode optical fiber having a substantially stepped refractive index structure is 0.05 dB or smaller. In the optical fiber according to this embodiment, even if MFD1 is made smaller, MFD can be maintained at a constant value. Therefore, the splicing loss can be suppressed to a small value. For example, if MFD at a wavelength of 1.31 μm is set to 8.6 μm, the fusion-splicing loss with respect to a general-purpose single-mode optical fiber can be set to 0.05 dB or smaller.

INDUSTRIAL APPLICABILITY

The optical fiber according to the present invention is also applicable to relatively long-distance transmission lines.

The invention claimed is:

1. An optical fiber comprising:
   a core extending in an axial direction while containing an axial center of the fiber, the core having a diameter d1 of 7.0 μm to 7.4 μm;
   a first optical cladding layer surrounding the core and having an outside diameter d2 of 1.67d1 to 2.5d1;
   a second optical cladding layer surrounding the first optical cladding layer; and
   a jacket layer surrounding the second optical cladding layer and containing fluorine having a concentration of 0.06 wt % or higher,
   wherein a relative refractive index difference Δ1 of the core with respect to the jacket layer is 0.31% to 0.37%, a relative refractive index difference Δ2 of the first optical cladding layer with respect to the jacket layer is +0.02% or larger and smaller than Δ1, and a relative refractive index difference Δ3 of the second optical cladding layer with respect to the jacket layer is −0.2% or smaller.

2. The optical fiber according to claim 1,
   wherein a ratio (d1/d2) is 0.4 to 0.5,
   wherein a mode field diameter MFD defined on the basis of a moment of a far-field pattern is 8.4 μm to 9.2 μm at a wavelength of 1.31 μm, and
   wherein a ratio (MFD1/MFD) of a mode field diameter MFD1 defined on the basis of a moment of an electric-field distribution to the MFD is 1.015 or smaller while a cable cutoff wavelength is 1260 nm or shorter.

3. The optical fiber according to claim 1, wherein the relative refractive index difference Δ3 of the second optical cladding layer is −0.6% or larger.

4. The optical fiber according to claim 3, wherein a zero-dispersion slope at a zero-dispersion wavelength is 0.092 ps/nm²/km or smaller.

5. The optical fiber according to claim 1, wherein the relative refractive index difference Δ3 of the second optical cladding layer is −0.6% or smaller.

6. The optical fiber according to claim 5, wherein a zero-dispersion slope at a zero-dispersion wavelength is larger than 0.092 ps/nm²/km.

7. The optical fiber according to claim 1, further comprising:
a primary coating layer surrounding the jacket layer and having a Young's modulus of 0.6 MPa or smaller; and
a secondary coating layer surrounding the primary coating layer and having a Young's modulus of 1000 MPa or larger.

8. The optical fiber according to claim 7, wherein a ratio (P/S) of an outside diameter of the primary coating layer to an outside diameter of the secondary coating layer is 75 to 95%.

9. The optical fiber according to claim 1, wherein a difference in transmission loss at a wavelength of 1550 nm between that before the optical fiber is formed into a cable and that after the optical fiber is formed into a cable is 0.05 dB/km or smaller.

10. The optical fiber according to claim 9, wherein the difference in transmission loss at a wavelength of 1550 nm between that before the optical fiber is formed into a cable and that after the optical fiber is formed into a cable is 0.02 dB/km or smaller.

11. The optical fiber according claim 1, wherein a fusion-splicing loss with respect to a general-purpose single-mode optical fiber having a substantially stepped refractive index structure is 0.05 dB or smaller.

12. An optical fiber cord comprising the optical fiber according to claim 1.

13. An optical fiber cable comprising the optical fiber according to claim 1.

* * * * *